Fig. 2.

Patented June 17, 1941

2,246,253

UNITED STATES PATENT OFFICE 2,246,253

PROCESS OF MAKING CEMENT

Herbert B. Johnson, Rochester, N. Y., assignor to Ritter Products Corporation, Rochester, N. Y., a corporation of New York Application November 18, 1937, Serial No. 175,299

8 Claims. (Cl. 106—100)

My invention relates, generally, to the manufacture of cement and it particularly relates to the recombining, compounding, and proportionately mixing of the mineral constituents used in raw mixes for the manufacture of Portland and other cement products and applies to the products which have been produced through the concentration or separation of associated minerals such as described in my copending application, Serial No. 151,950, filed July 3, 1937, now Patent No. 2,197,864, of which this application is a continuation in part.

In my copending application, I have disclosed how the cement minerals may be separated electrostatically into different discrete portions. One of these portions comprises an $Al_2O_3$ group, another is a $CaCO_3$ group and another is an $SiO_2$ group, which are termed respectively alumina, limestone and silica groups or products. These products are combined in varying quantities either alone or with a raw cement mineral product in order to meet different cement specifications depending upon the particular requirements of these specifications and the chemical analysis of the separated portions and of the raw cement minerals combined therewith.

My invention applies particularly to the cement rock deposits of Pennsylvania, New Jersey, and New York where, in many cases, there is a deficiency in the limestone minerals and an excess of silica, alumina, magnesia, and other minerals. Cement manufacturers, particularly in the Lehigh and Chester valley districts in Pennsylvania, and also in New York and New Jersey, are vitally concerned with the deficiency of limestone and excess alumina and magnesia minerals in their deposits. In many cases, this necessitates the purchase of limestone from outside sources which increases their production cost from 5¢ to 15¢ per barrel of cement produced. Many cement operations in the districts referred to have been abandoned on account of the high production costs resulting from a deficiency in limestone minerals and the high cost of purchasing and delivering these necessary minerals to their plants.

For a long time this situation has interested cement manufacturers and engineers in the possibility of concentrating this raw cement rock and other raw materials and by-products, with the object of decreasing or eliminating, through such concentration, the excess silica, alumina, and magnesia, and thereby increasing the limestone content so that purchase of limestone from outside sources would be unnecessary. The concentrating cost is much less than the cost of purchasing and delivering these materials so that, by the use of proper concentrating methods, the cement manufacturer becomes independent of outside sources of supply, reduces his production costs, increases his flexibility of control, and improves his salable cement products.

The art of concentration properly applied to cement operations results in the opening up of many deposits and makes possible the future operation of many plants which are now idle. At the same time the concentration of raw minerals used in manufacturing cement represents several new problems for the cement chemist and those responsible for operations, particularly in the recombination of the separated mineral elements in accordance with standard and special well known formulae. Cement manufacturers who are purchasing additional limestone have to deal with the impurities not only in their own quarries but also with the impurities in the additional limestone purchased from outside sources. Therefore, in some cases, it is necessary to deviate somewhat from standard raw mix formulae to meet a certain set of conditions. At the same time the buyers of the finished cement product are setting up specifications or requirements that are becoming more and more difficult to meet due principally to the fact that, heretofore, there has been no simple and flexible control of the process in manufacturing cement. The more rigid requirements for accurate concentration of cement rock and other raw cement materials present new problems to the cement manufacturer which are principally of mechanical rather than of chemical nature.

An object of my invention is to provide for meeting any cement specification, either standard or special, without requiring a special setup or adjustment of the apparatus employed in separating the cement minerals into certain distinct portions.

Another object of my invention is to provide for separating raw cement minerals as they are obtained from a cement quarry into predetermined discrete portions according to the constituents of the quarry minerals and for recombining these discrete portions to meet any standard or special cement specifications without requiring any change in the equipment employed for separating the raw cement minerals.

Still another object of my invention is to disassociate the steps employed in separating raw cement minerals from the steps employed in recombining them to make different cement specifications so that it is only necessary to change the recombining steps and not the separating steps in changing from one cement specification to another.

My invention is also particularly directed to the special treatment of the alumina products that are produced in the concentration of raw cement minerals. High silica cements are usually slow in setting and of good tensile strength. High alumina cements are usually quick setting and quick hardening. Cements too high in alumina are hard to burn properly, due to the fusibility of the calcium aluminate at such high temperatures which causes agglomeration and sticking of the clinker. Iron oxides, such as hematite, tend to lower the burning temperature and, within certain limits, assist in the production of sound cement although excess iron affects the color of the cement.

The essential elements of Portland cement are silica and lime. Alumina increases the fluidity of the mix during clinkering, thereby simplifying the burning operations and somewhat reducing the temperature required. Also, alumina adds somewhat to the plasticity of cement but, if used in excess, it directly speeds up the setting time. Alumina and iron minerals have little value in cement except as fluxing agents, thereby accelerating the actual combination of the lime and silica at proper temperatures during clinkering operations.

Another object of my invention is to control the alumina and iron content of the cement minerals employed in the manufacture of cement.

A further object of my invention is to treat the alumina and iron mineral products resulting from the separation of the raw cement minerals into discrete portions and to recombine them in the raw material mix in such manner that their fluxing action during the subsequent clinkering operation is materially improved and the resulting cement product is not deleteriously affected.

My invention is also particularly directed to the mechanical preparation and recombination of cement raw mix minerals which have been previously separated and it also provides for the special treatment of the alumina product, or fluxing minerals, so that much better control of the fusing action of the limestone and silica is accomplished with the minimum use of these fluxing minerals, thereby producing a much more uniform clinker and reducing, to some extent, the amount of gypsum used for correcting the setting time of the finished cement.

I have found that the alumina product, which is easily separated out electrostatically, as described in my application referred to hereinbefore, has a much lower degree of grindability than has the limestone or silica. I have compared the grindability of an original raw cement mix, prepared from cement rock, and the first concentrates or alumina product produced by electrostatic concentration. These materials were both screened through 100 mesh and were passed through a colloid mill having a clearance of .0002" and at a dilution of one-half part water to one part solids. Power consumption was considerably higher for grinding the original material and the average particle size was only reduced to approximately ten microns. The first concentrate, or alumina product produced in concentration, required much less power and was ground under the same conditions as the original raw cement mix but it was easily reduced to an average size particle of 3 microns.

According to my invention means are provided for producing a colloidal size material, or fluxing agent, and for evenly distributing the same on the particle surfaces of raw cement dust and the lime and silica minerals in the raw mix, thereby speeding up the bonding or fluxing action of the lime and silica while clinkering by evenly coating the particles with these bonding minerals, at proper temperature, and before they come into close contact where the acids and basic elements assist to produce a more uniform cement clinker. I take the first concentrate produced in separation and, after sampling, weighing, and putting in storage, pass this material as required through a colloid mill of suitable type. From the colloid mill discharge, I pass the product through pressure spray nozzles so that it is sprayed, like paint, to cover the particles of lime and silica when in suspension. This is done preferably when they are discharged from an elevator or screw conveyor into the recombination storage mixing bin, or just prior to entering the kilns after the final grinding. It is desirable to spray this material on the coarser sized particles while in air suspension, such as while they are dropping from the elevator or conveyor, in order to paint or coat each particle thoroughly and, by spraying, thereby preventing the colloidal fluxing minerals from balling up or forming cakes while coming in contact with the dry mixture. A dispersing agent may be employed which prevents the colloidal particles from coagulating and interfering with best spraying, spreading, or coating action. This dispersing agent should be mixed with the water added to the feed for the colloid mill which regulates the proper dilution and obtains maximum grinding and dispersion of the mineral particles. The addition of the colloidal fluxing agent increases the moisture or water content of the raw mix. For example, the fluxing agent at a dilution of .5:1 to 1:1 causes an increase of the average moisture content of the raw mix approximately 8 per cent. This prevents the colloidal substance from escaping or getting off of the particles during final grinding operations prior to entering the kiln for clinkering. Upon entering the kiln, this colloidal substance will adhere to the lime and silica minerals until the raw mix, at proper temperature, begins to ball up prior to entering the clinkering zone in the kiln. Therefore, on account of the even distribution of the flowing minerals throughout the raw mix there is little loss of the fluxing material, through circulation of air through the kiln, during kiln operation and, at proper temperature for clinkering. The particles of lime and silica are evenly coated with the fluxing agent so that proper combination thereof is made at minimum temperature and with a minimum of fuel being required. Obviously the finished clinker will be much more uniform than it would be if the fluxing materials were added in the dry state. This is due principally to the fact that, in spraying the finely ground colloidal fluxing minerals into the falling stream of raw mix minerals which are much coarser in size, a better mixing and covering power is available than would be possible by mixing these materials of the same size in a dry state.

A further object of my invention is to provide for grinding the fluxing minerals to a colloidal state and to thoroughly coat the particles of lime and silica with the fluxing agent thus formed before the raw mix is delivered to the kiln for clinkering.

Other objects of my invention will, in part, be obvious and in part appear hereinafter.

For a more complete understanding of the nature and scope of my invention, reference may be had to the following detailed description taken in connection with the accompanying drawings, in which:

Figure 1:
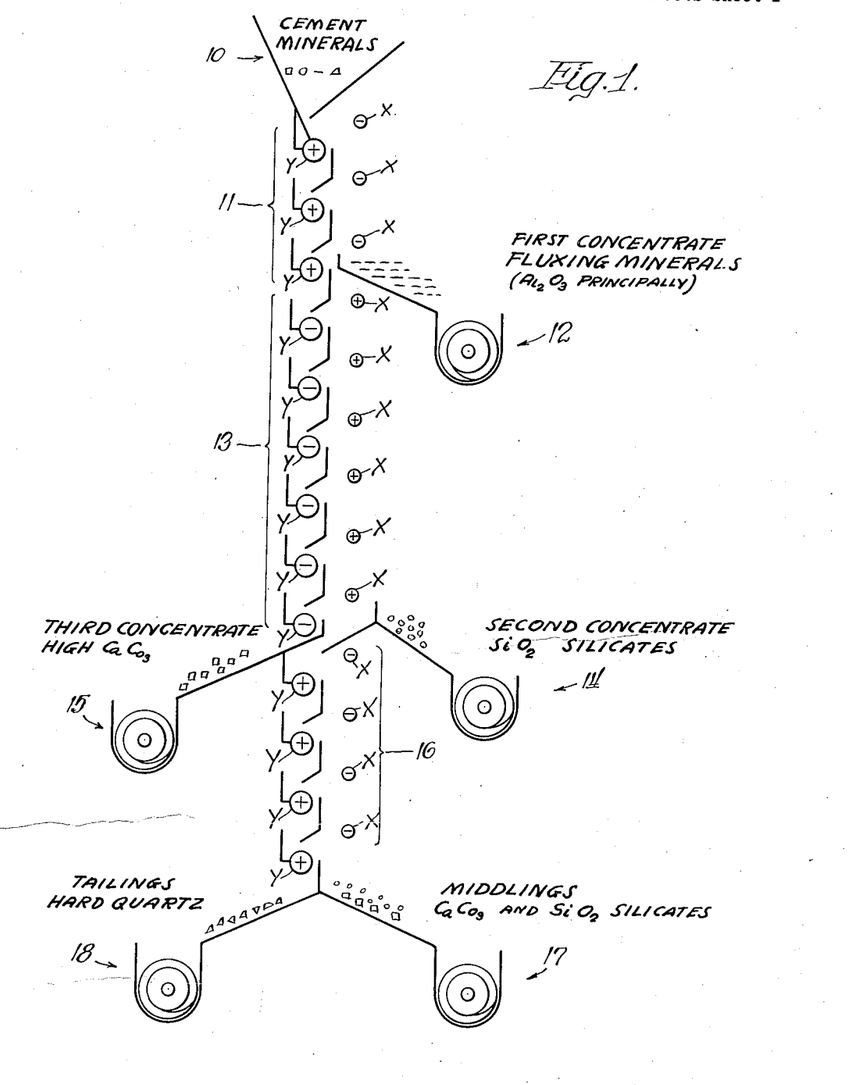
Figure 1 illustrates, diagrammatically, how different separations may be obtained in the use of the electrostatic separator.

Referring now particularly to Figure 1 of the drawings, it will be observed that I have there shown, diagrammatically, an electrostatic separator. This separator is of the type that is illustrated and described in detail in my copending application Serial No. 128,097, filed February 27, 1937, now Patent No. 2,135,716, and assigned to the assignee of this application. It comprises a plurality of pairs of rotating electrodes X and Y. Preferably these electrodes are generally cylindrical in shape and are relatively long, for example, from six to eight feet long. The electrodes may be maintained at a high difference of uni-directional voltage by a suitable source of direct current such as a mechanical rectifier or an electric valve rectifier. As disclosed in my copending application, Serial No. 151,950, now Patent No. 2,197,864 of which this application is a continuation in part, the electrodes X and Y may be divided into different groups for each of which different polarities and voltages may be employed as may best suit the particular separating conditions.

As shown in the drawings, the raw cement imnerals are fed into a hopper 10 in the proper state for most efficient electrostatic separation. The raw cement minerals are first fed into close proximity with electrodes Y of the first group 11 which are maintained at a positive potential, as indicated, relative to the electrodes X. This first group of electrodes 11 may comprise three pairs of electrodes that are maintained at a difference of potential of about 6,000 volts.

At this voltage a first concentrate comprising the fluxing minerals, principally $Al_2O_3$, is thrown out and carried away by a material conveyor 12. This conveyor may be of the screw type, as illustrated. While the first concentrate is composed principally of $Al_2O_3$, there will also be some of the other cement minerals present but in considerably less proportions than in the original raw cement minerals. Iron minerals, in the form of pyrites, will also be present in the fluxing minerals that are thrown out as a result of the first separation by the first group 11 of electrodes X and Y.

The balance of the cement minerals are then subjected to the electrostatic fields maintained between the next group 13 of electrodes X and Y in which the X electrodes are maintained at a positive potential relative to the Y electrodes and preferably at a potential difference of about 12,000 volts. In this group the cement raw materials are fed into close proximity with the negative Y electrodes. At the bottom of this group of electrodes, a second and a third concentrate may be removed by the product conveyors 14 and 15 respectively. The second concentrate will contain a large percentage of $SiO_2$ silicates while the third concentrate will contain a high percentage of $CaCO_3$ or lime.

The remaining portion of the raw cement minerals is then fed between the pairs of electrodes X and Y of the third group 16 in which the Y electrodes are maintained at a positive potential with respect to the X electrodes and at a potential difference of about 18,000 volts. In this group the raw cement minerals are fed into close proximity with the positive Y electrodes with the result that the cement minerals are separated into middlings and tailings that are carried away by product conveyors 17 and 18 respectively. The middlings contain principally $CaCO_3$ and $SiO_2$ silicates and are returned to be reprocessed through the separator. The tailings comprise principally hard quartz which may be reprocessed or discarded as waste material.

While the first group 11 of electrodes comprises three pairs, the second group 13 comprises six pairs, and the third group 16 comprises four pairs, it will be obvious that different numbers may be employed in each group without departing from the scope of my invention. Also the polarities of the electrodes in the various groups may be changed as will best suit a given set of operating conditions. Also, different voltages may be employed as may be desired. The particular arrangement of electrodes, and polarities and voltages used are set forth for illustrative purposes and are representative of what I have found to be the best for a particular set of conditions and analysis of raw cement minerals.

Figure 2:
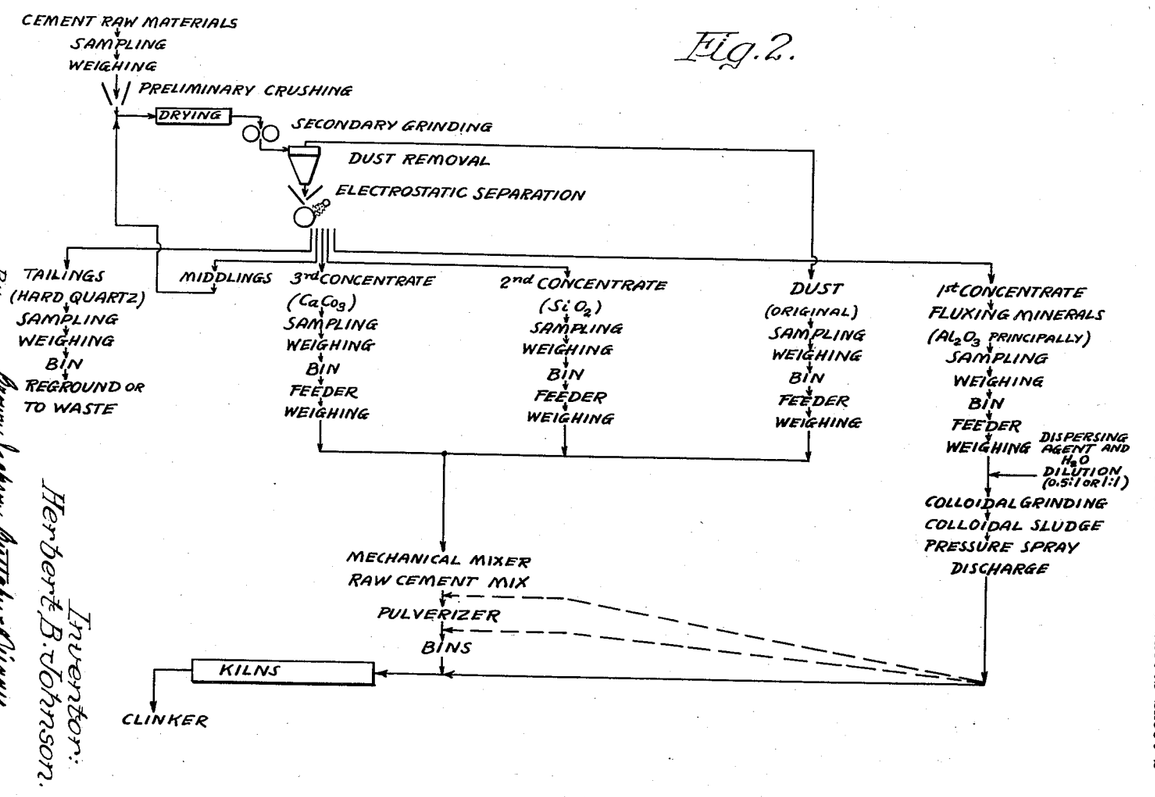
Figures 2 through 6 illustrate flow sheets that may be employed in practicing my invention.

In the flow sheet shown in Figure 2, I have shown an arrangement of equipment for preparing the cement raw minerals for electrostatic separation, for removing the impalpable dust after grinding, and for storing the separated products made by the electrostatic separation and the dust for subsequent recombination, as desired. As shown, each product is automatically and continuously sampled and it is also automatically and continuously weighed by recording scales of either the dump type or conveyor type before it enters its storage bin. In this manner at any time the recorded weights may be taken for a shift, a day, or any period of operation, and computed with the chemical analysis of the various minerals for a particular period of operation. This will place the operator at all times in a position to know the exact tonnage and mineral content of each bin.

The materials as drawn from the storage bins pass through adjustable automatic feeders and again through automatic weighing machines. These feeders may be adjusted from experience so that the proper weights are assured in proportioning the separated products and recombining them into raw mixes to meet different cement specifications and so that the weighing machines can always check the rate of feeding of each product. Chemists and operators in charge of such a mill flow sheet soon learn to regulate the automatic feeders with the weighing machines and to secure very close control of these products.

When my improved process for making cement is employed, it will be obvious that it is extremely flexible in application. The products that are placed in the different storage bins may be so disposed with reference to the particular chemical analysis of the quarry rock that is being processed. Suitable adjustments may be made in the separating equipment to obtain the desired separated products. With a given separating setup, quarry stock of varying chemical analysis may be processed and the separated products stored in different bins, the contents and chemical analysis of each of which will be readily available to the operator or cement chemist. When it is desired to meet a given cement specification, it is only necessary to withdraw from the different bins the necessary quantities in accordance with their chemical analysis. Therefore, the separating steps may be carried out entirely independently of the recombining steps. For a given cement specification it is unnecessary to alter the operation of the entire flow sheet but rather it is merely necessary to withdraw from the different storage bins the desired amounts of raw cement minerals having known chemical analysis and to recombine them preparatory to performing the clinkering operation. Likewise the separating steps may be carried out without particular consideration being given to any particular cement specification that it may be necessary to meet. It is then unnecessary to select particular parts of the quarry rock for processing and in most cases the general run of mine rock may be employed. As a result the cost of quarrying is materially reduced and at the same time the life of the quarry is materially prolonged by making available portions of it which were previously considered unfit for economical use in manufacturing cement.

Referring again to the flow sheet shown in Figure 2, it will be observed that, after being sampled, weighed, and properly proportioned, the fluxing minerals in the first concentrate product, composed principally of $Al_2O_3$, are mixed with a sufficient quantity of dispersing agent, such as sodium carbonate, and water to form a solution of from .5:1 to 1:1 which is sufficient to cause the solids to flow through the colloid mill satisfactorily. I prefer to use a colloid mill of the "Premier Mill" type, which works on the principle of particle bombardment rather than other types which work on the principle of abrasion although these other types may be employed without departing from the scope of the present invention.

The colloidal sludge obtained from the colloid mill has a great covering power as indicated hereinbefore. It is pumped under pressure and applied through spray discharge nozzles to the raw cement minerals prior to clinkering. As shown these raw mix minerals are obtained from a combination of the second and third concentrates with the dust product obtained from the secondary grinding operation prior to electrostatic separation. The combination of these products is in accordance with the analysis of the final cement product that it is desired to obtain. After the dry products are mixed in a suitable mechanical mixer, the colloid sludge is applied thereto either before going through the pulverizer, or after they leave the pulverizer or just before the mix is conveyed to the kiln for the clinkering operation.

Figure 3:
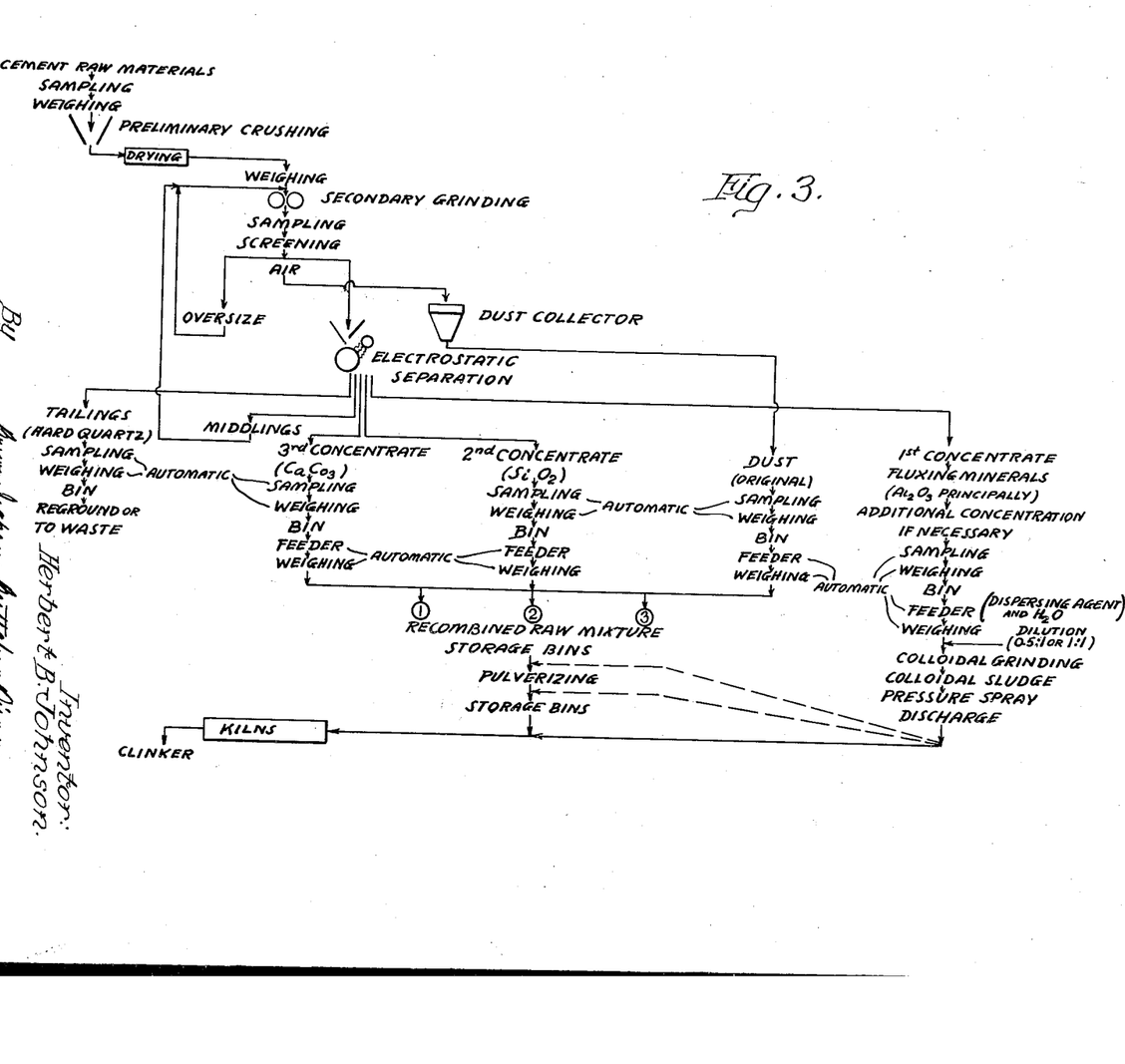

As illustrated in the flow sheet shown in Figure 3, the first concentrate containing the fluxing minerals may be further concentrated. Whether or not this additional concentrating step of these minerals is desirable depends upon the analysis of the particular rock that is being processed and the degree of separation that can be obtained in the first instance. This additional concentration step of the fluxing minerals may be employed prior to their being placed in solution and ground in the colloid mill. The fluxing agent in colloid form is then sprayed into the recombined raw mix minerals as described.

Figure 4:
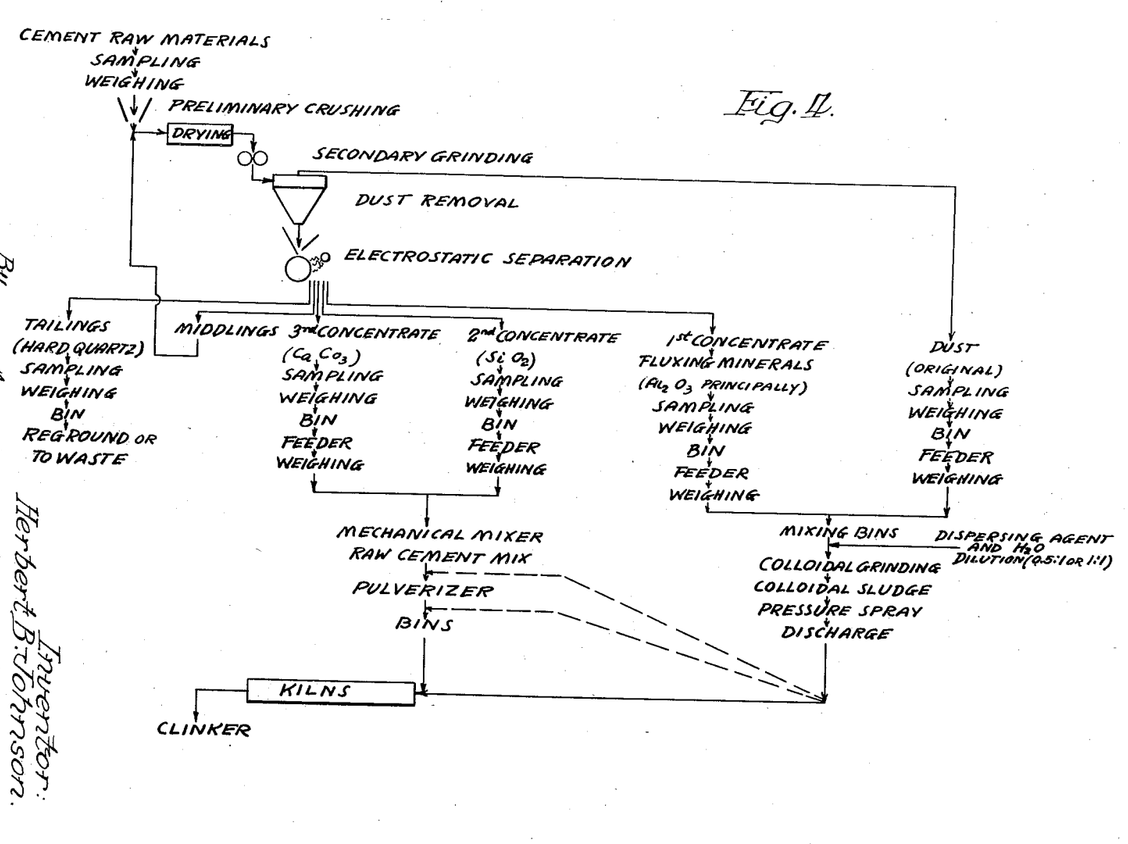

The flow sheet illustrated in Figure 4 shows that the original dust, after being properly sampled and weighed, may be processed with the fluxing minerals so that the two products may be ground together and reduced to colloidal size. Through pressure spraying apparatus the combined dust and fluxing minerals in the colloidal state may be combined with the coarser particles before or after pulverizing or just before the raw cement mix is conveyed to the kiln for clinkering. In this manner a larger percentage of the raw mix in the wet state is evenly sprayed and mixed with the coarser particles of the separated products containing principally the $CaCO_3$ and the $SiO_2$ minerals.

When the impalpable dust produced is a result of the crushing operation and removed by air separation or the like is combined with the fluxing minerals, as illustrated in the flow sheet shown in Figure 4, and passed through the colloid mill or other suitable fine-grinding equipment, the resulting dust lost in clinkering operation in a rotating type kiln will be reduced to a minimum because of the evenly distributed addition of moisture to the dry mixture. Since this moisture is thoroughly distributed, it will then cause a balling up action soon after the recombined cement minerals enter the kiln due to the rotating action thereof. This will reduce the losses through air circulation in the kiln. The finely dispersed particles will quickly become baked upon the coarser particles and carried to the clinkering zone where maximum fluxing will take place promptly. This thorough distribution and even spreading of the fluxing elements throughout the raw mixture produces a much more uniform clinker that is much easier to pulverize than the clinkers formed in accordance with the prior art. Therefore, the cost of the clinker grinding operation will be reduced and at the same time a more uniform resulting cement product will be obtainable.

Figure 5:
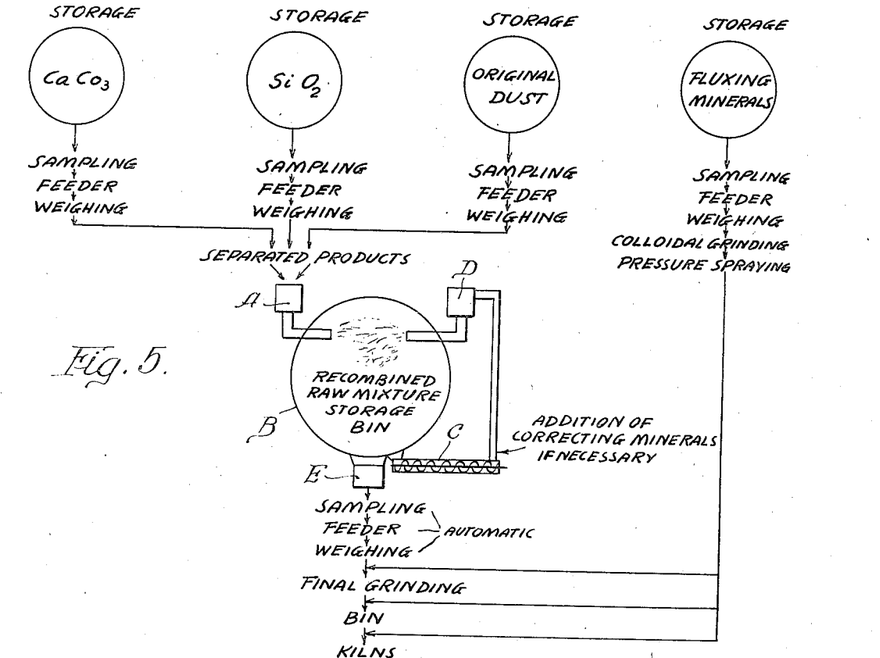

The flow sheet shown in Figure 5 indicates in a more detailed manner how the separated raw cement mineral products may be recombined in the proper proportions to meet a desired cement specification. As shown the products resulting from the electrostatic separation are stored in different bins to be drawn off as desired. The products from these storage bins are sampled, weighed, and proportioned by automatic feeders before delivery to elevator A, which itself does considerable mixing in delivering the combination material to the top of the raw mixture storage bin B. As shown this material may be continuously drawn from the bottom of the mixing bin by a mixing conveyor C and returned to the top of the bin by elevator D.

Preferably elevators A and D discharge the materials at the top of the bin B against each other in order to more thoroughly mix the particles. This arrangement for mixing the cement materials is particularly convenient in the event that the cement specification is changed or in the event that it is desirable to correct further any combination of minerals by the addition of $CaCO_3$, $SiO_2$, or $Al_2O_3$ minerals. Such additions of these minerals as desired may be drawn from the individual product bins in the necessary proportions and fed into conveyor C without interfering with the continuous operation of the recombining apparatus. The mixture from the mixing bin is then discharged therefrom through elevator E.

Obviously a number of the raw mixture storage bins may be employed in each of the flow sheets shown in Figures 2, 3, and 4 for recombining and thoroughly mixing the separated cement minerals and the original dust. The number used will depend upon the number of different cement specifications that it is necessary to meet. A sufficient number should be provided so that there will always be sufficient storage capacity of raw mixes ahead of the kilns in order to assure of continuous operation of the plant.

Figure 6:
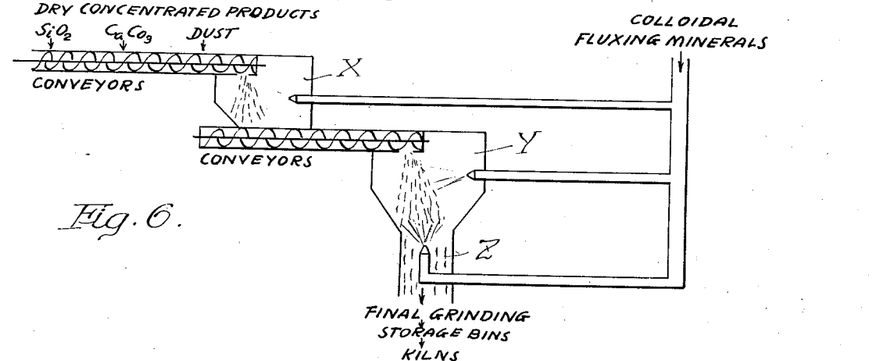

In the flow sheet shown in Figure 6, the preferred method of applying the colloidal fluxing minerals is shown. I have found that, on such dry materials as cement minerals, it is preferred to add the finely divided colloidal paste gradually and evenly in order to obtain optimum coverage of the dry particles. Therefore, the colloidal paste may be proportionately divided under pressure by using spray nozzles of different capacities. For example, of the total amount added, one-third may be mixed at X, one-third at Y, and one-third at Z. This repeated application of the fluxing mineral sludge permits a more even distribution with minimum possibility of balling up action which would otherwise take place when mixing dry and wet materials. However, this method is not limited to any specific number of spray nozzles. Any desired number of different capacities may be used at the most convenient places in the flow sheet as will assure the maximum and most uniform coverage of the $CaCO_3$ and $SiO_2$ minerals. These nozzles may be full cone, hollow cone, or flat spray types as may fit operating conditions most suitably.

Since certain further changes may be made in carrying out my invention, it is intended that all matter contained in the above description or shown in the accompanying drawings shall be interpreted as illustrative and not in a limiting sense.

I claim:

1. In the dry method of manufacturing cement, the steps which comprise: successively passing finely divided raw cement material between a plurality of pairs of oppositely charged electrodes and in close proximity to the positive electrodes and thereby separating out a fluxing concentrate, successively passing the balance of the raw cement material between a plurality of pairs of oppositely charged electrodes and in close proximity to the negative electrodes and thereby separating out a $CaCO_3$ concentrate, and successively passing the remaining balance of the raw cement material between a plurality of pairs of oppositely charged electrodes and in close proximity to the positive electrodes and thereby separating the same into a hard quartz concentrate and a middling portion containing principally $CaCO_3$ and $SiO_2$.

2. In the dry method of manufacturing cement, the steps which comprise: successively passing finely divided raw cement material between a plurality of pairs of oppositely charged electrodes and in close proximity to the positive electrodes and thereby separating out a fluxing concentrate, successively passing the balance of the raw cement material between a plurality of pairs of oppositely charged electrodes and in close proximity to the negative electrodes and thereby separating out a $CaCO_3$ concentrate and an $SiO_2$ concentrate, and successively passing the remaining balance of the raw cement material between a plurality of pairs of oppositely charged electrodes and in close proximity to the positive electrodes and thereby separating the same into a hard quartz concentrate and a middling portion containing principally $CaCO_3$ and $SiO_2$.

3. In the method of manufacturing cement, the steps which comprise: successively passing finely divided raw cement material between a plurality of pairs of oppositely charged electrodes and in close proximity to those of one polarity to separate out a fluxing concentrate the $Al_2O_3$ content of which is substantially higher than that of the original raw cement material, collecting said $Al_2O_3$ concentrate, successively passing the balance of the finely divided raw cement material between a plurality of pairs of oppositely charged electrodes and in close proximity to those of one polarity to separate the same into $SiO_2$ and $CaCO_3$ concentrates, and individually collecting the last named concentrates.

4. In the method of manufacturing cement, the steps which comprise: successively passing finely divided raw cement material between a plurality of pairs of oppositely charged electrodes and in close proximity to those of positive polarity to separate out a fluxing concentrate the $Al_2O_3$ content of which is substantially higher than that of the original raw cement material, collecting said $Al_2O_3$ concentrate, successively passing the balance of the finely divided raw cement material between a plurality of pairs of oppositely charged electrodes and in close proximity to those of negative polarity to separate the same into $SiO_2$ and $CaCO_3$ concentrates, and individually collecting the last named concentrates.

5. In the dry method of manufacturing cement the steps which comprise: feeding finely divided raw cement material between a pair of electrodes maintained at a high difference of uni-directional voltage and in close proximity to one of them and thereby separating out a fluxing concentrate, feeding the balance of the raw cement material between a pair of electrodes maintained at a high difference of uni-directional voltage and in close proximity to the electrode thereof having a polarity opposite to the polarity of the electrode in close proximity to which the material is first fed and thereby separating out a $CaCO_3$ concentrate, and feeding the remaining balance of the raw cement material between a pair of electrodes maintained at a high difference of uni-directional voltage and in close proximity to the electrode thereof having the same polarity as the electrode adjacent to which the material is first fed and thereby separating the remaining balance into a hard quartz concentrate and a middling portion containing principally $CaCO_3$ and $SiO_2$.

6. In the dry method of manufacturing cement the steps which comprise: feeding finely divided raw cement material between a pair of electrodes maintained at a high difference of unidirectional voltage and in close proximity to one of them and thereby separating out a fluxing concentrate, feeding the balance of the raw cement material between a pair of electrodes maintained at a high difference of unidirectional voltage and in close proximity to the electrode thereof having a polarity opposite to the polarity of the electrode in close proximity to which the material is first fed and thereby separating out a $CaCO_3$ concentrate and an $SiO_2$ concentrate, and feeding the remaining balance of the raw cement material between a pair of electrodes maintained at a high difference of uni-directional voltage and in close proximity to the electrode thereof having the same polarity as the electrode adjacent to which the material is first fed and thereby separating the remaining balance into a hard quartz concentrate and a middling portion containing principally $CaCO_3$ and $SiO_2$.

7. In the dry method of manufacturing cement, the steps which comprise: successively feeding finely divided raw cement material between a plurality of pairs of electrodes maintained at a high difference of uni-directional voltage and in close proximity to the electrodes of one polarity and thereby separating out a fluxing concentrate, successively feeding the balance of the raw cement material between a plurality of pairs of electrodes maintained at a high difference of uni-directional voltage and in close proximity to the electrodes having a polarity opposite to the polarity of the electrodes in close proximity to which the material is first fed and thereby separating out a $CaCO_3$ concentrate, and successively feeding the remaining balance of the raw cement material between a plurality of pairs of electrodes maintained at a high difference of uni-directional voltage and in close proximity to the electrodes having the same polarity as the electrodes adjacent to which the material is first fed and thereby separating the remaining balance into a hard quartz concentrate and a middling portion containing principally $CaCO_3$ and $SiO_2$.

8. In the dry method of manufacturing cement, the steps which comprise: successively feeding finely divided raw cement material between a plurality of pairs of electrodes maintained at a high difference of uni-directional voltage and in close proximity to the electrodes of one polarity and thereby separating out a fluxing concentrate, successively feeding the balance of the raw cement material between a plurality of pairs of electrodes maintained at a high difference of unidirectional voltage and in close proximity to the electrodes having a polarity opposite to the polarity of the electrodes in close proximity to which the material is first fed and thereby separating out a $CaCO_3$ concentrate and an $SiO_2$ concentrate, and successively feeding the remaining balance of the raw cement material between a plurality of pairs of electrodes maintained at a high difference of uni-directional voltage and in close proximity to the electrodes having the same polarity as the electrodes adjacent to which the material is first fed and thereby separating the remaining balance into a hard quartz concentrate and a middling portion containing principally $CaCO_3$ and $SiO_2$.

HERBERT B. JOHNSON.